United States Patent
Takahashi et al.

(10) Patent No.: US 7,045,106 B2
(45) Date of Patent: May 16, 2006

(54) METHOD FOR PRODUCING INORGANIC POROUS MATERIAL

(75) Inventors: Ryoji Takahashi, Chiba (JP); Satoshi Sato, Chiba (JP); Akiyuki Yachi, Chiba (JP)

(73) Assignee: Tokuyama Corporation, Yamaguchi (JP)

( * ) Notice: Subject to any disclaimer, the term of this patent is extended or adjusted under 35 U.S.C. 154(b) by 127 days.

(21) Appl. No.: 10/475,004

(22) PCT Filed: Apr. 16, 2002

(86) PCT No.: PCT/JP02/03784

§ 371 (c)(1),
(2), (4) Date: Oct. 16, 2003

(87) PCT Pub. No.: WO02/085785

PCT Pub. Date: Oct. 31, 2002

(65) Prior Publication Data

US 2004/0149654 A1   Aug. 5, 2004

(30) Foreign Application Priority Data

Apr. 17, 2001 (JP) .............................. 2001-117995

(51) Int. Cl.
C01B 33/12 (2006.01)
B01J 21/08 (2006.01)
B01J 21/12 (2006.01)
B01J 21/14 (2006.01)

(52) U.S. Cl. ...................... 423/335; 423/338; 502/233; 502/234

(58) Field of Classification Search ................ 423/335, 423/338, 339; 502/232, 233, 243, 407, 408
See application file for complete search history.

(56) References Cited

U.S. PATENT DOCUMENTS

| 4,216,113 | A | * | 8/1980 | Winyall | 523/210 |
| 4,752,458 | A | | 6/1988 | Robinson | |
| 5,342,876 | A | * | 8/1994 | Abe et al. | 524/493 |
| 5,951,962 | A | * | 9/1999 | Muller et al. | 423/702 |

FOREIGN PATENT DOCUMENTS

| JP | 1-176235 A | 7/1989 |
| JP | 3-56535 A | 3/1991 |
| JP | 5-85762 A | 4/1993 |
| JP | 5-193927 A | 8/1993 |
| JP | 5-310413 A | 11/1993 |
| JP | 11-35313 A | 2/1999 |
| JP | 11-139819 A | 5/1999 |
| JP | 2000-34117 A | 2/2000 |

* cited by examiner

Primary Examiner—Colleen P. Cooke
(74) Attorney, Agent, or Firm—Birch, Stewart, Kolasch & Birch LLP (57) ABSTRACT

A process for producing an inorganic porous material, comprising the steps of preparing an aqueous medium solution containing water-glass as a silica source, a water-soluble polymer and an acid, causing phase separation and gelation in the solution at the same time to form a wet gel, and washing and drying the gel.

According to the present invention, use of water-glass which is easily acquired as a silica source makes it possible to produce porous silica having mutually continuous through holes with macro-pores. According to the present invention, the diameter of each macro-pore can be controlled to a desired value.

8 Claims, 9 Drawing Sheets

○: mutually continuous through holes
▲: isolated pores
×: macroscopic 2-phase separation
▽: giant continuous pores
□: no macro-pores initial composition and macrostructure of silica gel Fig. 1 relationship between washing time and the amount of residual Na ◎: mutually continuous through holes
▲: isolated pores
✕: macroscopic 2-phase separation
▽: giant continuous pores
□: no macro-pores Fig. 2 initial composition and macrostructure of silica gel

◎: mutually continuous through holes
▲: agglomerated particles
○: giant continuous structure
□: no macro-pores Fig. 4 initial composition and macrostructure of silica gel ◎: mutually continuous through holes
▲: agglomerated particles
○: giant continuous structure
□: no macro-pores Fig. 5 initial composition and macrostructure of silica gel

◎: mutually continuous through holes

□: no macro-pores

Fig. 7 initial composition and macrostructure of silica gel

◎: mutually continuous through holes
□: no macro-pores
▽: giant continuous pores Fig. 8 initial composition and macrostructure of silica gel

METHOD FOR PRODUCING INORGANIC POROUS MATERIAL

This application is the national phase under 35 U.S.C. § 371 of PCT International Application No. PCT/JP02/03784 which has an International filing date of Apr. 16, 2002, which designated the United States of America.

DETAILED DESCRIPTION OF THE INVENTION

The present invention relates to a process for producing an inorganic porous material. More specifically, it relates to an industrially advantageous process for producing porous silica which is suitably used for chromatography columns, solid catalysts and enzyme carriers.

DESCRIPTION OF THE PRIOR ART

In general, an inorganic porous material such as a silica gel is produced by a sol-gel method which is a liquid phase reaction. The sol-gel method generally refers to a method of finally obtaining an agglomerate or polymer by forming a polymerizable low molecular weight compound. Typical examples of the method include the hydrolysis of a metal alkoxide, hydrolysis of a metal chloride, hydrolysis of a metal salt or coordinate compound having a carboxyl group or hydrolyzable functional group such as β-diketone, and hydrolysis of a metal amine.

When a silica gel is to be produced by the sol-gel method using a silicon alkoxide such as TEOS (tetraethoxysilane) or TMOS (tetramethoxysilane), mutually continuous through holes (macro-pores) having an extremely small diameter in a micrometric order can be formed by adding a polymer. It is considered that a gel is formed by the hydrolytic and polycondensation reactions of a silicon alkoxide in a stage where phase separation by spinodal decomposition is induced by the addition of the polymer to form an intertwined structure and this structure grows bigger, thereby making it possible to fix the structure and form such mutually continuous through holes.

Further, since a silica gel can be provided with pores having an extremely small diameter in a nanometric order (nano-pores), it is considered that bimodal porous silica which can be expected to have functions such as fluidity and diffusion due to the above mutually continuous through holes and a large specific surface area due to nano-pores can be produced and used as a material for catalytic carriers and columns.

PROBLEM TO BE SOLVED BY THE INVENTION

However, a silicon alkoxide is a very expensive compound and it is economically difficult to use bimodal porous silica obtained from the compound as an industrial material such as a catalytic carrier.

MEANS FOR SOLVING THE PROBLEM

The inventors of the present invention have found that porous silica having mutually continuous through holes with an extremely small diameter can be produced from water-glass (water-soluble silicate) which can be acquired at a low price as a silica source and has accomplished the present invention based on this finding.

That is, according to the present invention, there is provided a process for producing an inorganic porous material, comprising causing phase separation and gelation in an aqueous solution containing water-glass as a silica source at the same time to form a wet gel, washing the gel and drying it.

Further, according to the present invention, there is provided a process for producing an inorganic porous material, comprising preparing an aqueous medium solution containing water-glass as a silica source, a water-soluble polymer and an acid, forming a wet gel from the solution, washing the gel and drying it.

In the present invention, in order to form a wet gel by causing phase separation and gelation in an aqueous solution containing water-glass at the same time, means of promoting gelation by making a water-soluble polymer existent in the aqueous solution containing water-glass is advantageously employed.

The water-soluble polymer is a water-soluble organic polymer which can form an aqueous solution having a suitable concentration theoretically, preferably a water-soluble organic polymer which can dissolve uniformly in the aqueous solution containing water-glass.

Examples of the water-soluble polymer include sodium salts or potassium salts of polystyrene sulfonic acid as polymer metal salts; polyacrylic acids which are polymer acids and are dissociated to become a polyanion; polyallylamine or polyethyleneimine which are polymer bases and form a polycation in an aqueous solution; polyethylene oxide having an ether bond in the main chain as a neutral polymer; polyvinyl alcohols having a hydroxyl group in the side chain; and polyvinyl pyrrolidone having a carbonyl group.

Out of these, polyacrylic acids and polyvinyl alcohols are preferred because they are easy to handle. The polyacrylic acids preferably have a molecular weight of 15,000 to 300,000, preferably 20,000 to 150,000.

The water-glass used in the present invention is generally a concentrated aqueous solution of an alkali silicate. Since the water-glass must be suitably diluted with water at the time of preparing a specimen in the present invention, it is not limited to a particular type. A silica gel may be dissolved in a concentrated alkali aqueous solution to directly prepare the water-glass, or a commercially available water-glass based on JIS industrial standards may be used. Sodium silicate JIS No. 3 which is a JIS standard water-glass or equivalent thereof is particularly preferred because it is easy to handle as a raw material.

The water-glass has a $SiO_2$ content of about 5 to 40 wt %. That is, 3 to 25 wt % of $SiO_2$ is generally diluted with water. This is aimed to prevent the formation of an inhomogeneous solution due to viscosity or the like when the water-glass is mixed with a water-soluble polymer aqueous solution. The content of $SiO_2$ in the final solution after the water-soluble polymer aqueous solution is mixed with the water-glass is preferably 2 to 20 wt %, particularly preferably 11 to 14 wt %.

The final content of the water-soluble polymer is 1 to 5 wt %, preferably 2 to 4 wt %.

Since the water-glass contains an alkali metal element such as Na unlike silicon alkoxide, it is a strong basic substance. Therefore, it is preferred to reduce pH of the water-glass to a gelation range of a silica. For the reduction of pH, an acid is added to the diluted water-glass aqueous solution. The range of pH is 7 or less, preferably 0 to 4.

The above acid is a mineral acid or organic acid such as sulfuric acid, hydrochloric acid or nitric acid having a concentration high enough to neutralize the water-glass. It is preferably a mineral acid having a concentration of 0.1 M or more, or an organic acid such as acetic acid or formic acid having a concentration of 0.1 M or more.

The procedure of mixing the water-glass aqueous solution and the water-soluble polymer aqueous solution is not particularly limited. The water-glass aqueous solution may be added to the water-soluble polymer aqueous solution or vice versa. The procedure of mixing an acid is not particularly limited as well. In general, the following mixing procedure is preferably used to prevent the agglomeration of a nonuniform silica component or coexistent water-soluble polymer at the time of mixing.

(1) A water-soluble polymer is dissolved in water to prepare a water-soluble polymer aqueous solution.
(2) Water is added to water-glass and stirred to prepare a homogeneous water-glass aqueous solution having a predetermined concentration.
(3) An acid and the water-soluble polymer aqueous solution (1) and optionally water are stirred to prepare an aqueous solution.
(4) The water-glass aqueous solution (2) is added to the aqueous solution (3) and stirred to prepare a homogeneous solution.

In this procedure, time and labor required for dissolving the water-soluble polymer are eliminated by preparing an aqueous solution of the water-soluble polymer, and further the modification of the water-soluble polymer and the generation of an acidic gas such as $No_x$ at the time of preparing the solution can be minimized by shortening a time for exposing the water-soluble polymer to an acid.

The amount of the water-soluble polymer dissolved in water is generally 1 to 20 wt %, preferably 2 to 10 wt %. However, the optimum amount may be suitably changed by the type and polymerization degree of the water-soluble polymer.

The final amount of the acid is 0.1 to 5 mols, preferably 1 to 4 mols based on 1 liter of the final solution. The amounts of the water-glass, water-soluble polymer and acid in the preparation of the final solution as described above change mainly according to the type and molecular weight of the water-soluble polymer in use. The water-soluble polymer is preferably a polyacrylic acid (molecular weight of about 20,000 to 30,000) from the viewpoints of solubility, viscosity and acid resistance. The acid is preferably a strong acid. Porous silica having micrometric pores which are controlled by the final amount of each component as described above is obtained.

The diameter and continuity of macro-pores of the porous silica obtained by the present invention are fixed by changing the concentration of the solution and the gelation temperature at the time of preparing a gel, that is, gelation. They can be controlled by changing the growth stage of the transient structure of a separated phase.

The used water is not particularly limited but distilled water or ion exchange water is preferred to prevent contamination by water.

As for a typical gelation method for obtaining a wet gel, the solution (4) obtained by the above method is placed in a closed vessel and left to stand at 0 to 80° C., preferably 10 to 30° C. for 10 minutes to 1 week, preferably 1 to 24 hours. The time required for gelation is generally about 10 minutes to 10 hours and the time including standing after gelation may be 1 day or 1 week, which does not affect the structure of the product. The above gelation time means a time required for the gel to achieve certain strength.

The prepared wet gel is washed before it is dried. This is because the disintegration of the gel proceeds as the wet gel is being dried when the wet gel obtained from the water-glass is dried as it is. It is considered as a reason for it that in the stage of forming a gel, an alkali metal element such as Na enters the skeleton of the gel to reduce the strength of the gel. Therefore, an alkali metal such as Na contained in the wet gel must be removed as an alkali metal salt by washing before it is dried.

Washing is carried out by immersing the gel in water at room temperature for 12 hours or more when the gel has a thickness of about 1 cm. If the thickness of the gel is smaller than 1 cm, washing may be carried out for a shorter period of time.

Washing is desirably continued until the amount of the residual alkali metal becomes 1 wt % or less, preferably 0.2 wt % or less, particularly preferably 0.1 wt % or less as a metal based on $SiO_2$. Washing is carried out at 0 to 80° C., preferably 20 to 30° C. for 1 hour to 1 week, preferably 1 to 3 days.

When the amount of the residual alkali is large at the time of washing, cracking readily occurs, the crystallization of cristobalite readily occurs at the time of baking, and carbon is apt to remain. The washing time which changes according to the thickness of the gel (specimen) is preferably long for the removal of an alkali. The upper limit of the washing time is determined from an economical point of view. The above preferred washing conditions are conditions under which a desired amount of the residual alkali is obtained when a specimen having a thickness of about 5 mm to 1 cm is used.

The diameters of the nanometric pores of the porous silica obtained by the present invention can be mainly controlled by aging the gel in water before it is dried after it is washed as described above. This aging is carried out in water or an alkali aqueous solution having a concentration of 0.01 to 10 M (for example, an ammonia water solution) at 0 to 200° C., preferably 20 to 80° C. for 1 hour to 1 week, preferably 2 days to 4 days. PH of the solution is 1 to 10, preferably 4 to 10.

The gel washed and optionally aged by the above methods is dried in the air or inert gas atmosphere such as nitrogen or argon in order to remove a solvent such as water. Drying is generally carried out at 20 to 80° C., preferably 30 to 50° C. for 1 day to 1 week, preferably 2 days to 5 days. The present invention is not limited to this condition.

The porous silica obtained after drying has strength high enough to hold a macro-pore structure. However, the porous silica may be baked to remove an organic substance and increase its strength according to purpose for using. The baking is carried out at 500 to 1,100° C., preferably 500 to 800° C. The baking atmosphere may be air or inert atmosphere.

BRIEF DESCRIPTION OF THE DRAWINGS

FIGS. 3(1) to 3(3) are SEM photos of a gel having mutually continuous through holes;

EXAMPLES

Example 1

A gel was prepared by the following procedure.
(1) HPAA (polyacrylic acid manufactured by Wako Pure Chemical Industries, Ltd.; average molecular weight of 25,000) was dissolved in water to prepare 22 g of a 25 wt % aqueous solution of HPAA.
(2) 60 g of water was added to 50 g of water-glass (J sodium silicate No. 3 manufactured by The Nippon Chemical Industrial Co., Ltd.) and stirred with a glass stick to prepare a homogeneous water-glass aqueous solution.
(3) The HPAA aqueous solution (1) and 7.1 g of water were added to 36.6 g of concentrated nitric acid.
(4) The water-glass aqueous solution (2) was added to the solution (3) and stirred with a stirrer to prepare a homogenous solution.
(5) The solution (4) was transferred to a plastic case, the plastic case was sealed up by a vinyl tape, and then the solution was left in the thermostat maintained at 25° C. for 24 hours (gelation).
(6) The formed gel was cut into a 1 to 2 cm$^3$ cube which was then immersed in about 250 ml of water to be washed for 3 days (water was exchanged every 24 hours).
(7) The washed gel was transferred to a thermostat maintained at 50° C. and dried for 3 days.

Example 2

Figure 1:
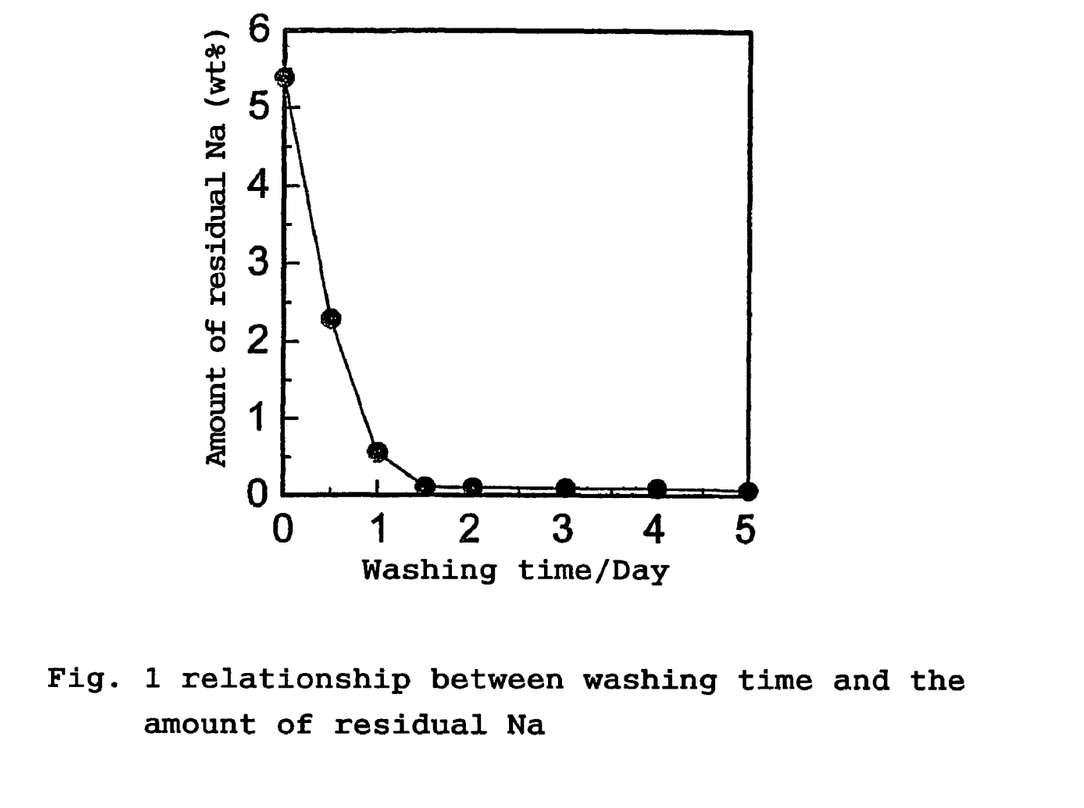
FIG. 1 is a diagram showing the relationship between washing time and the amount of the residual Na.

To verify the effect of washing, the amount of the residual Na when a gel was prepared in the same manner as in Example 1 except for washing time was measured and shown in FIG. 1. The amount of the residual Na was analyzed by atomic absorption spectrophotometry. It was found from FIG. 1 that up to about 0.1 wt % of Na could be removed by three days of washing.

The analytical results of the relationship among washing time, baking time and the formed crystal phase which was analyzed by X-ray diffraction (XRD) are shown in Table 1.

TABLE 1

Relationship among washing time, baking time and the crystal structure of gel (by XRD)

|  | No washing | 12 hours and 24 hours of washing | 3 days of washing |
| --- | --- | --- | --- |
| Amount of residual Na | 5.39 wt % | 0.565 wt % | 0.095 wt % |
| Only drying [Shape after drying] | Deposition of NaNO$_3$ [broken] | Amorphous [cracked] | Amorphous [as-shaped] |
| Baking at 700° C. | Cristobalite, etc. (trace carbon) | Cristobalite (trace carbon) | Amorphous |
| Baking at 900° C. | — | — | Amorphous |
| Baking at 1,100° C. | — | — | Amorphous |

* [12 hours and 24 hours of washing]: after 12 hours of immersion in water, water is exchanged for fresh water and the gel is immersed in the fresh water for 24 hours.
* [3 days of washing]: the gel is immersed in water which is exchanged every 24 hours for 3 days.

It is understood from Table 1 that the disintegration of an unwashed gel was confirmed from the deposition of NaNO$_3$ when it was dried and that when the gel was baked at 700° C., silica was existent as a cristobalite phase, and the residual carbon was confirmed visually. It is known that as the content of coexistent Na increases, silica turns into a cristobalite phase at a lower temperature. As it is assumed that the removal of carbon at the time of baking was inhibited by the existence of Na, it is understood that a large amount of Na remained in the unwashed gel. This agrees with the results of FIG. 1.

Although a gel subjected to 12 hours of washing and 24 hours of washing cracked when it was dried, the crystallization of NaNO$_3$ did not occur. However, after baking at 700° C., a cristobalite phase was formed and the residual carbon was confirmed. Therefore, it is considered that the removal of Na was unsatisfactory.

A gel subjected to 3 days of washing did not crack when it was dried and even when the baking temperature was raised to 1,100° C., the gel was not crystallized and kept amorphous and the residual carbon was not observed. Therefore, it can be considered that the removal of Na was satisfactory.

Example 3

Figure 2:
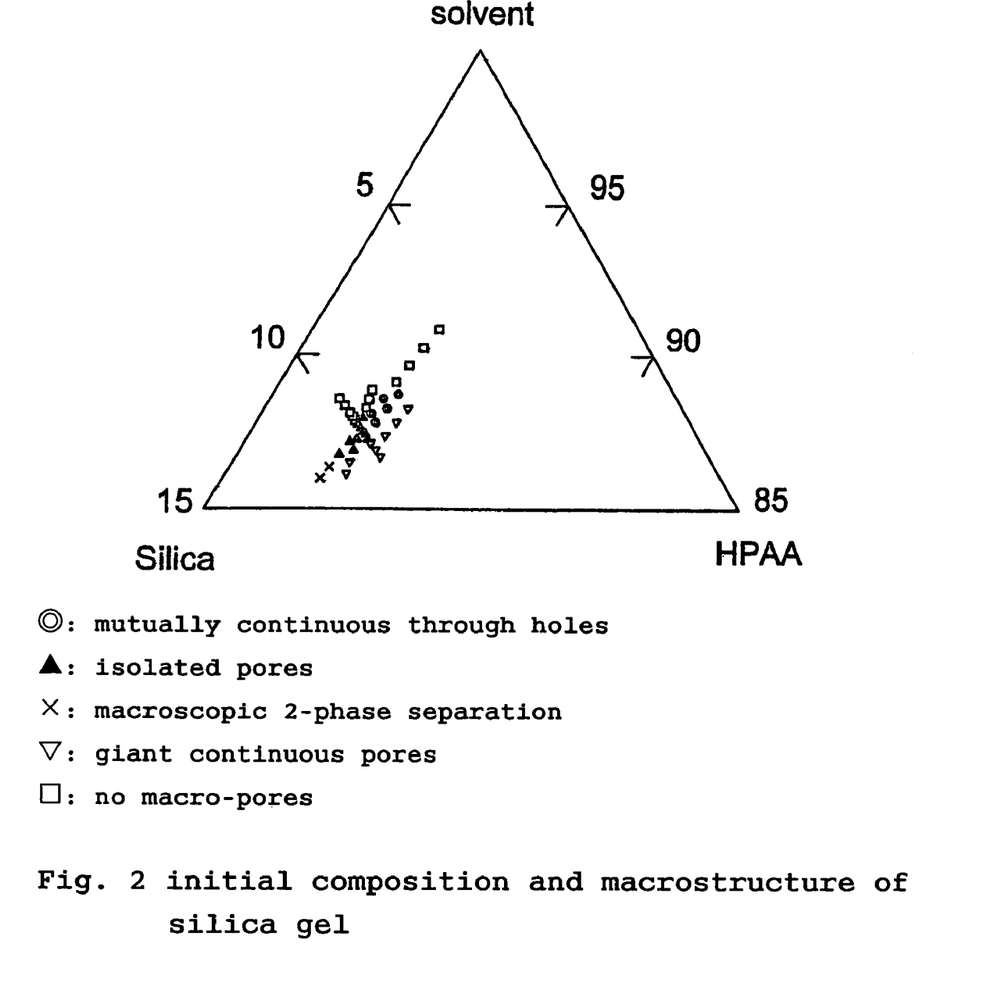
FIG. 2 is a triangular diagram showing the initial composition and macrostructure of each gel (average molecular weight of HPAA of 25,000)
Figure 3:
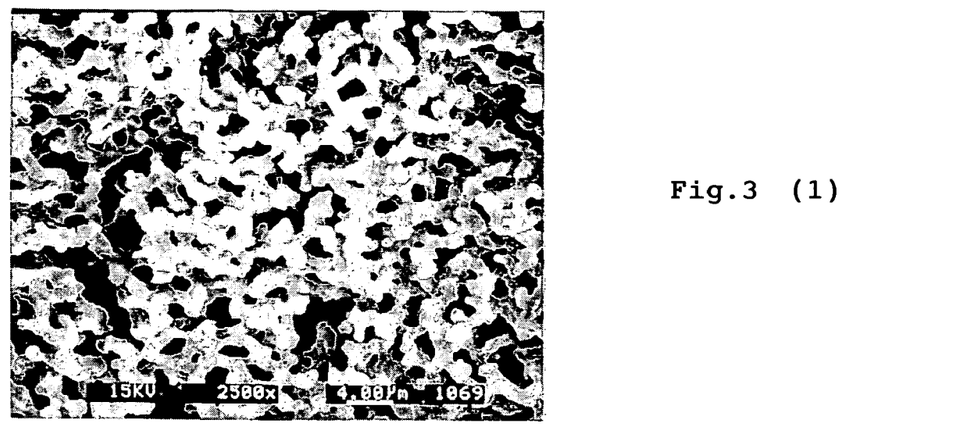

Various gels which differed in initial composition were prepared in the same manner as in Example 1. The initial composition of each gel is as follows.
(1) water-glass: 50.0 g, water: 97.6 g, concentrated nitric acid: 36.5 g, HPAA: 6.5 g
(2) water-glass: 54.9 g, water: 96.3 g, concentrated nitric acid: 37.1 g, HPAA: 6.5 g
(3) water-glass: 59.9 g, water: 96.7 g, concentrated nitric acid: 36.6 g, HPAA: 6.5 g FIG. 2 is a triangular diagram showing the initial composition and macrostructure of each gel when the macrostructure of each prepared dried gel was observed through SEM. It was confirmed from FIG. 2 that each structure had a systematic area distribution. The unit of the figures in FIG. 2 is wt % (the same shall apply hereinafter).

The diameters of the macro-pores of gels having mutually continuous through holes change according to variation in the above initial composition as shown in FIGS. 3(1) to 3(3). FIG. 3(1) shows a gel having a pore diameter of about 1 μm, FIG. 3(2) shows a gel having a pore diameter of about 3 μm, and FIG. 3(3) shows a gel having a pore diameter of about 10 μm.

Therefore, it was verified that the diameters of macropores can be controlled by changing the initial composition.

Example 4

Figure 4:
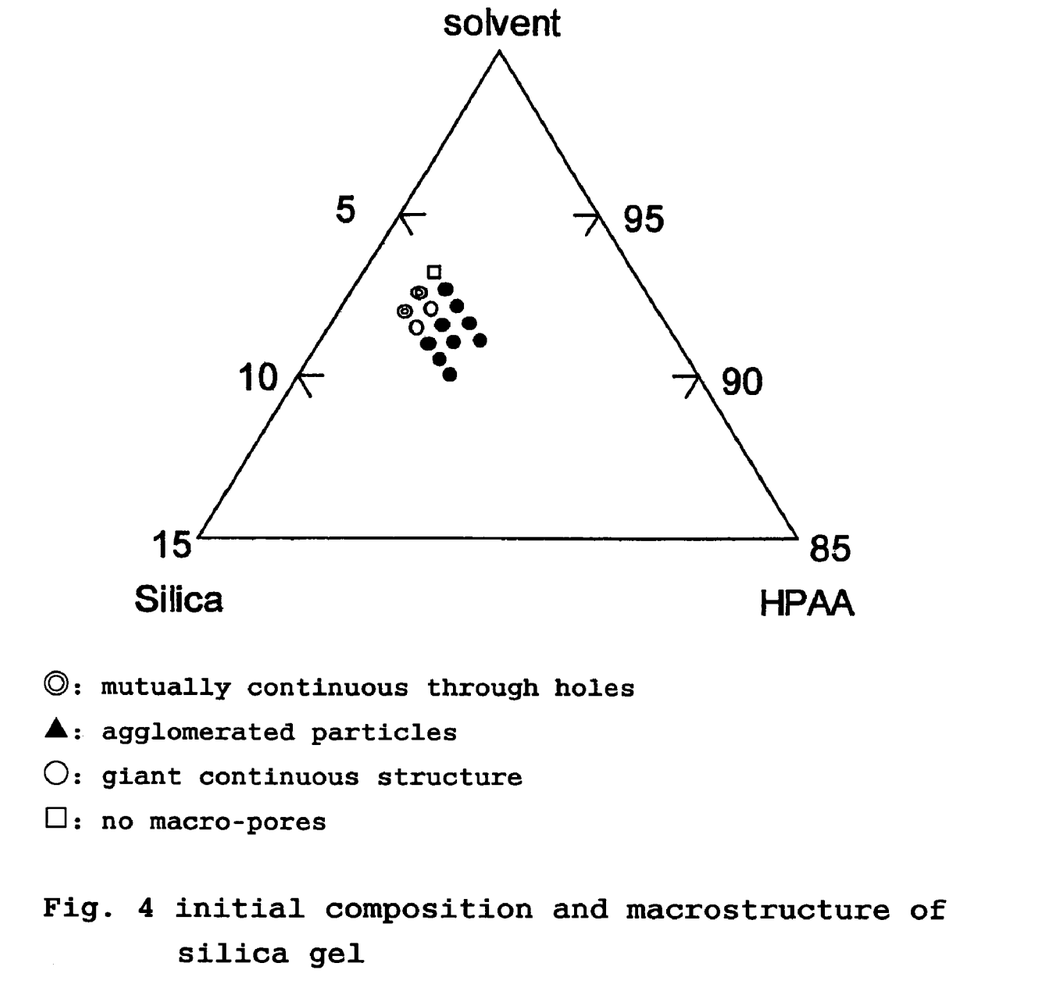
FIG. 4 is a triangular diagram showing the initial composition and macrostructure of each gel (average molecular weight of HPAA of 90,000)
Figure 5:
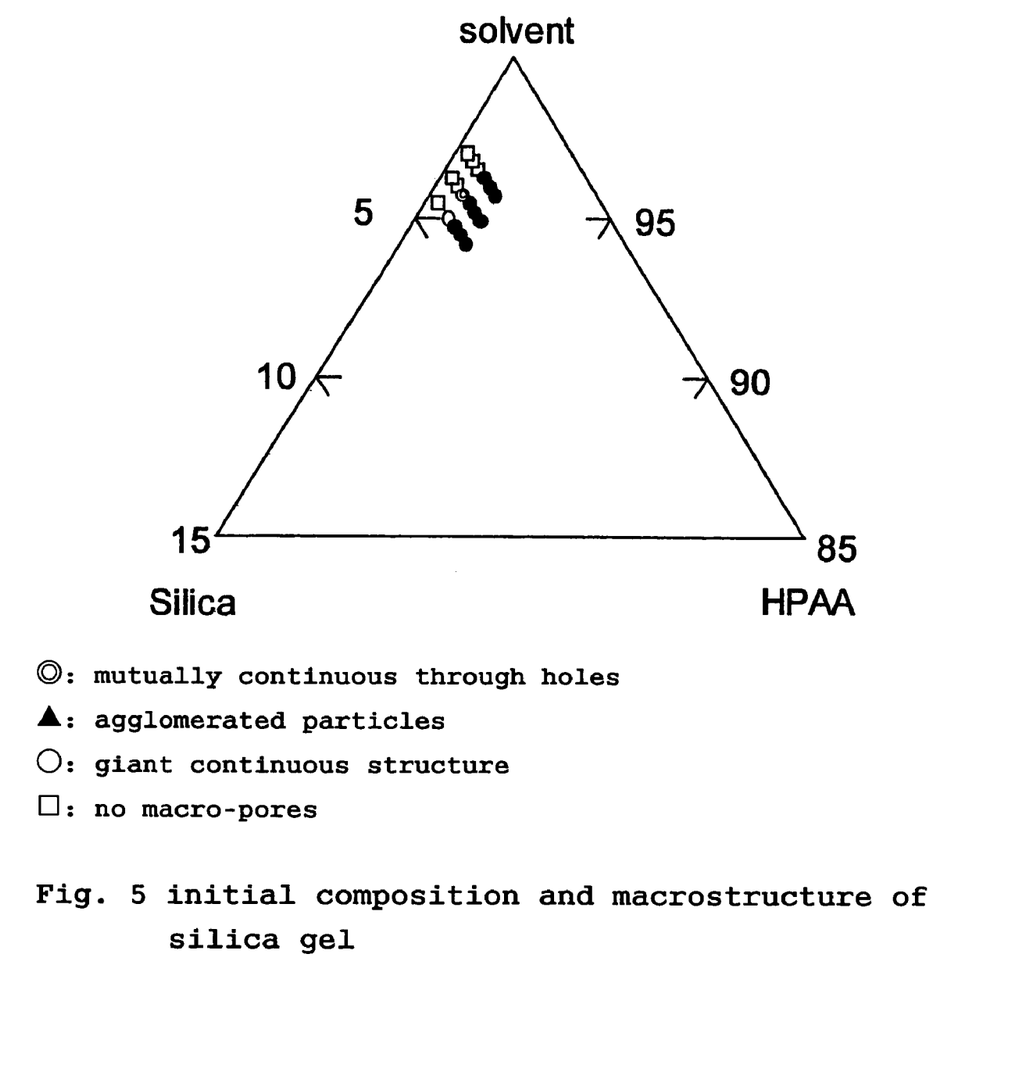
FIG. 5 is a triangular diagram showing the initial composition and macrostructure of each gel (average molecular weight of HPAA of 250,000)

Various gels which differed in initial composition were prepared by using HPAA having a different average molecular weight from that of HPAA of Example 1 (average molecular weight: 25,000). FIG. 4 and FIG. 5 are triangular diagrams showing the initial composition of each gel and macrostructure of each silica gel when the macrostructure of each prepared dried gel was observed through SEM. FIG. 4 shows when HPAA having an average molecular weight of 90,000 was used and FIG. 5 shows when HPAA having an average molecular weight of 250,000 was used.

Example 5

The gel of Example 1 obtained after Na was removed by washing was aged in an ammonia aqueous solution having a concentration of 0.1 M at 50 to 80° C. for 48 hours, dried and baked at 700° C. to control the diameters of its nanopores. When the nano-pore diameter distribution of a silica gel having mutually continuous through holes was investigated by nitrogen adsorption, only pores having a diameter of 3 nm or less were existent in a specimen which was not aged in a basic solution. However, a peak in the pore diameter distribution was observed at a pore diameter of 12 nm in a specimen which was aged at 50° C. in an ammonia aqueous solution having a concentration of 0.1 M and at a pore diameter of 18 nm in a specimen which was aged at 80° C. The pore diameter became larger as the concentration of the basic solution and the aging temperature increased.

Therefore, it is understood that the diameters of nanopores can be controlled by aging conditions independently of the diameters of macro-pores.

Example 6

Porous silica was formed by using the following polyvinyl alcohol (PVA) in place of HPAA. PVA-I: polyvinyl alcohol manufactured by Wako Pure Chemical Industries, Ltd.; average polymerization degree of 500, completely saponified PVA-II: polyvinyl alcohol manufactured by Wako Pure Chemical Industries, Ltd.; average polymerization degree of 500, partly saponified A gel was prepared by the following procedure.
(1) Water-glass (J sodium silicate No. 3 manufactured by the Nippon Chemical Industrial Co., Ltd.) and water were added to a polybeaker and stirred with a glass stick to prepare a homogeneous water-glass aqueous solution.
(2.) Concentrated nitric acid (60 wt %, molecular weight of 63.01, special grade manufactured by Wako Pure Chemical Industries, Ltd.), water and predetermined PVA were added to another polybeaker and stirred with a stirrer to prepare a homogeneous solution.
(3) The water-glass aqueous solution (1) was gradually added to the solution (2) while they were stirred violently with a stirrer.
(4) After the solution (3) became homogenous, it was transferred to a plastic vessel and left to stand in the thermostat maintained at 25° C. for 24 hours by sealing up the vessel with a vinyl tape (gelation and phase separation proceeded at the same time).
(5) After standing, the gel was cut into a 1 to 2 cm³ cube which was then immersed in about 250 ml of water to be washed for three days (to remove Na). Water was exchanged every day.
(6) The washed gel was transferred to a thermostat maintained at 50° C. and dried for 3 days.

Figure 6A:
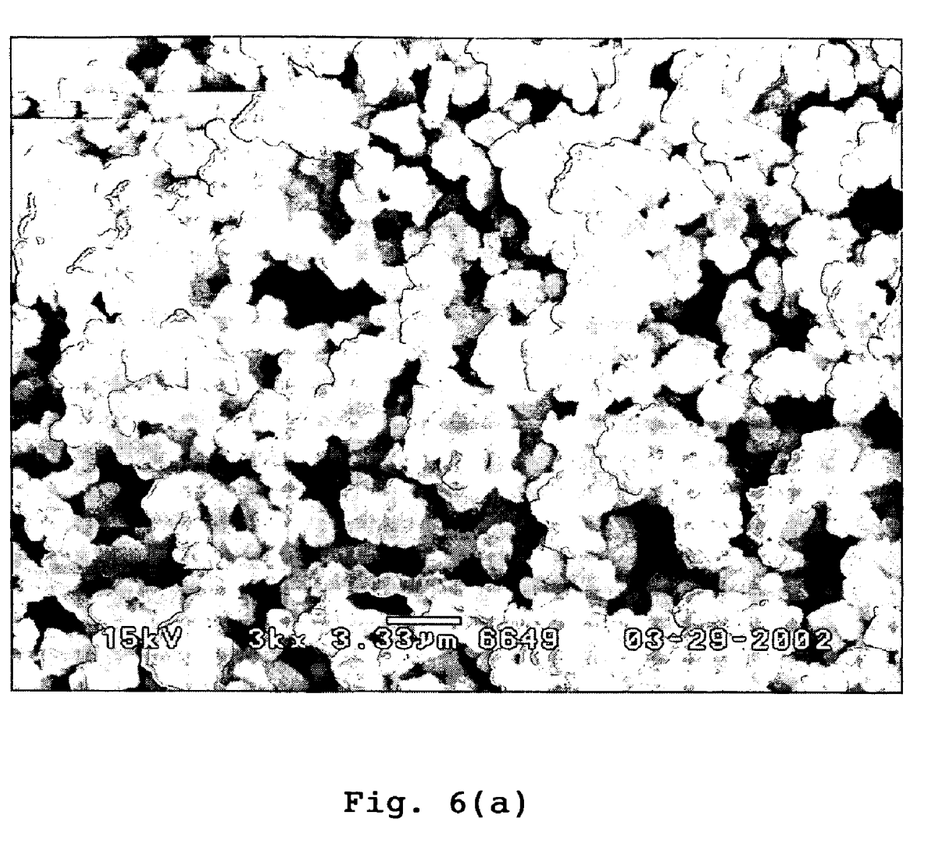
FIGS. 6(a) and 6(b) are SEM photos showing a change in the macrostructure of a water-glass-PVA-I system.
Figure 6B:
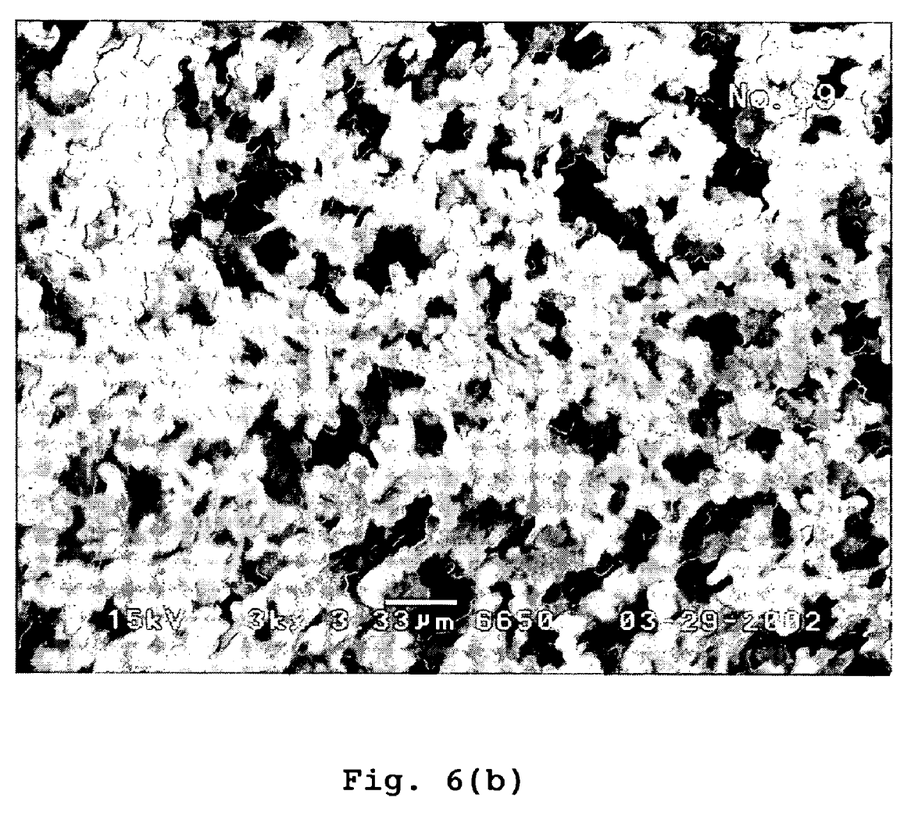
Figure 7:
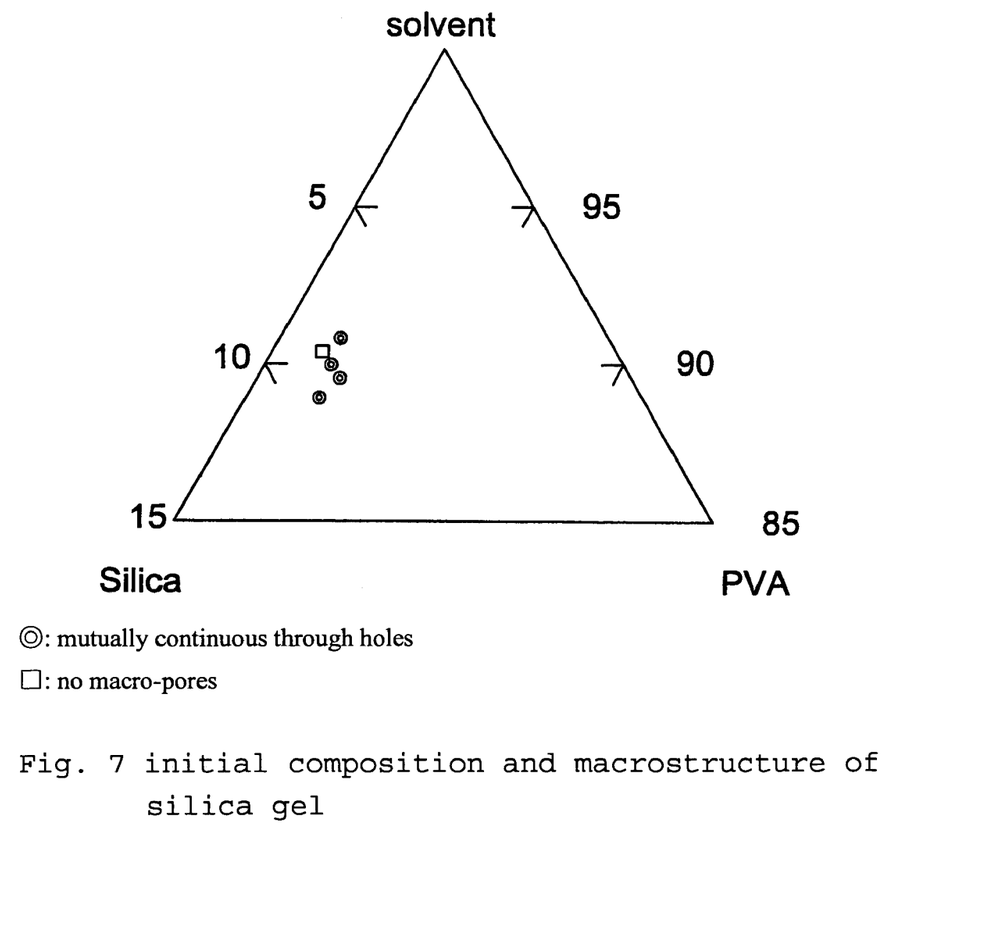
FIG. 7 is a triangular diagram showing the initial composition and macrostructure.

After the gel was formed by using PVA-I, phase separation occurred and a clouded gel was obtained. As shown in FIGS. 6(a) and 6(b), it is understood that when the initial composition is the same, as the amount of PVA increases, the domain size (pore diameter) becomes smaller. FIG. 6(a) is an SEM photo of a gel obtained when 5.0 g of PVA (macro-pore diameter of about 2 μm) was used and FIG. 6(b) is an SEM photo of a gel obtained when 6.0 g of PVA (macro-pore diameter of about 1.5 μm) was used. When 7.0 g of PVA was used, the macro-pore diameter of the obtained gel was about 1 μm. FIG. 7 is a triangular diagram showing the typical initial compositions and macrostructures of the prepared silica gels. In the figure, ⊙ shows a silica gel having mutually continuous through holes, Δ shows a silica gel having agglomerated particles, and □ shows a silica gel having no macro-pores. It is understood that gels which have experienced phase separation and have mutually continuous through holes (macro-pores) can be prepared at a wide composition range. It was found from their SEM photos that the diameters of their macro-pores were about 1.5 μm.

Figure 8:
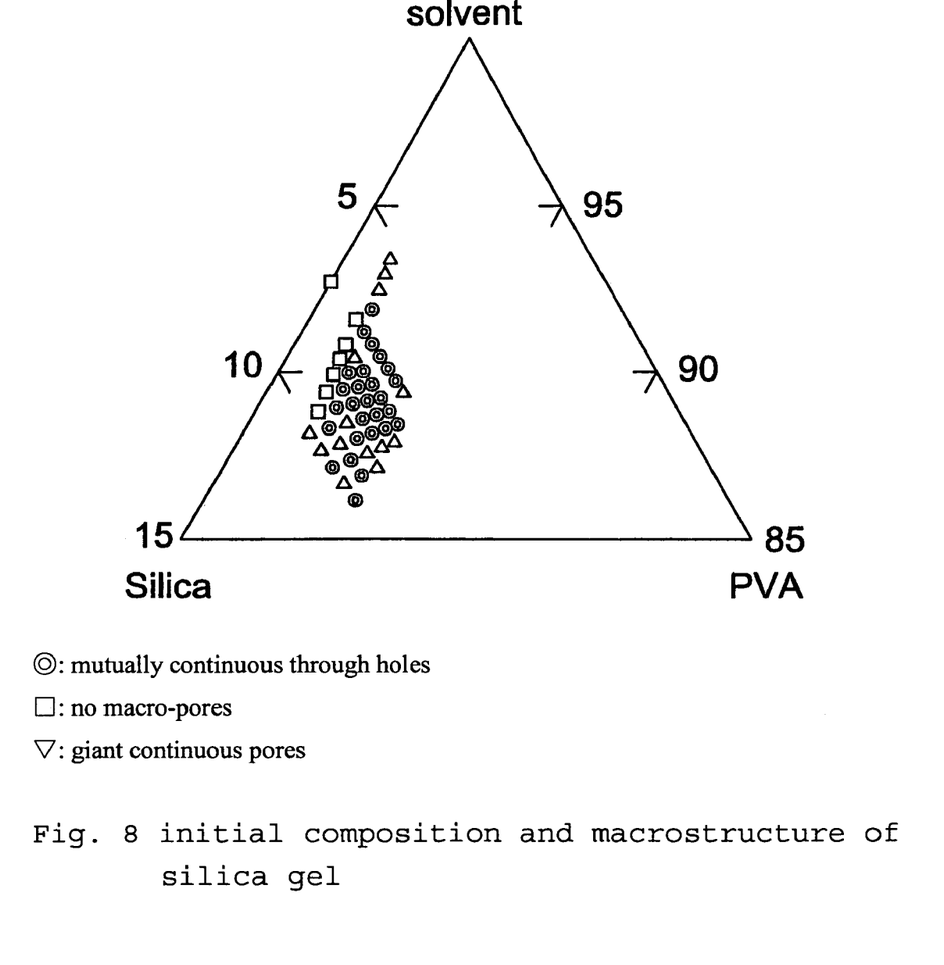
FIG. 8 is a triangular diagram showing the initial composition and macrostructure of a water-glass-PVA-II system.

Gels having initial composition shown in FIG. 8 were prepared by using PVA-II. As a result, phase separation occurred, clouded gels were obtained, and the same tendency as when PVA-I was used was seen when their macrostructures were observed through SEM. In FIG. 8, ⊙ shows a silica gel having mutually continuous through holes, and □ shows a silica gel having no macro-pores. It was found from their SEM photos that the diameters of their macro-pores were about 2.0 μm.

According to the present invention, an inorganic porous material having bimodal pores can be produced at a low cost by using water-glass as a silica source in place of a silicon alkoxide. Therefore, it can be used as an industrial material.

The invention claimed is:

1. A process for producing an inorganic porous material, comprising the steps of:
   preparing an aqueous medium solution of pH 0 to 4 containing water-glass as a silica source, a water-soluble polymer and an acid, therefore
   causing phase separation and gelation in the aqueous solution;
   forming a wet gel from the solution;
   washing the gel; and
   drying it.

2. The process for producing an inorganic porous material according to claim 1, wherein the gel is baked after it is dried.

3. The process for producing an inorganic porous material according to claim 1 or 2, wherein after the wet gel is washed, it is aged and dried.

4. The process for producing an inorganic porous material according to claim 1 or 2, wherein washing is carried out until the content of an alkali metal becomes 0.2 wt % or less.

5. The process for producing an inorganic porous material according to claim 1 or 2, wherein the content of silica ($SiO_2$) in the aqueous medium solution containing water-glass, a water-soluble polymer and an acid is 2 to 20 wt %.

6. The process for producing an inorganic porous material according to claim 1 or 2, wherein the inorganic porous material has a bi-modal pore distribution containing macropores and nanopores.

7. The process for producing an inorganic porous material according to claim 1 or 2, wherein the water-soluble polymer is at least one selected from the group consisting of a metal salt of polystyrene sulfonic acid, polyacrylic acid, polyallylamine, polyethyleneimine, polyethylene oxide, polyvinyl alcohol, and polyvinyl pyrrolidone having a carbonyl group.

8. The process for producing an inorganic porous material according to claim 1, wherein the phase separation and gelation occurs at the same time.

* * * * *